Figure 8:
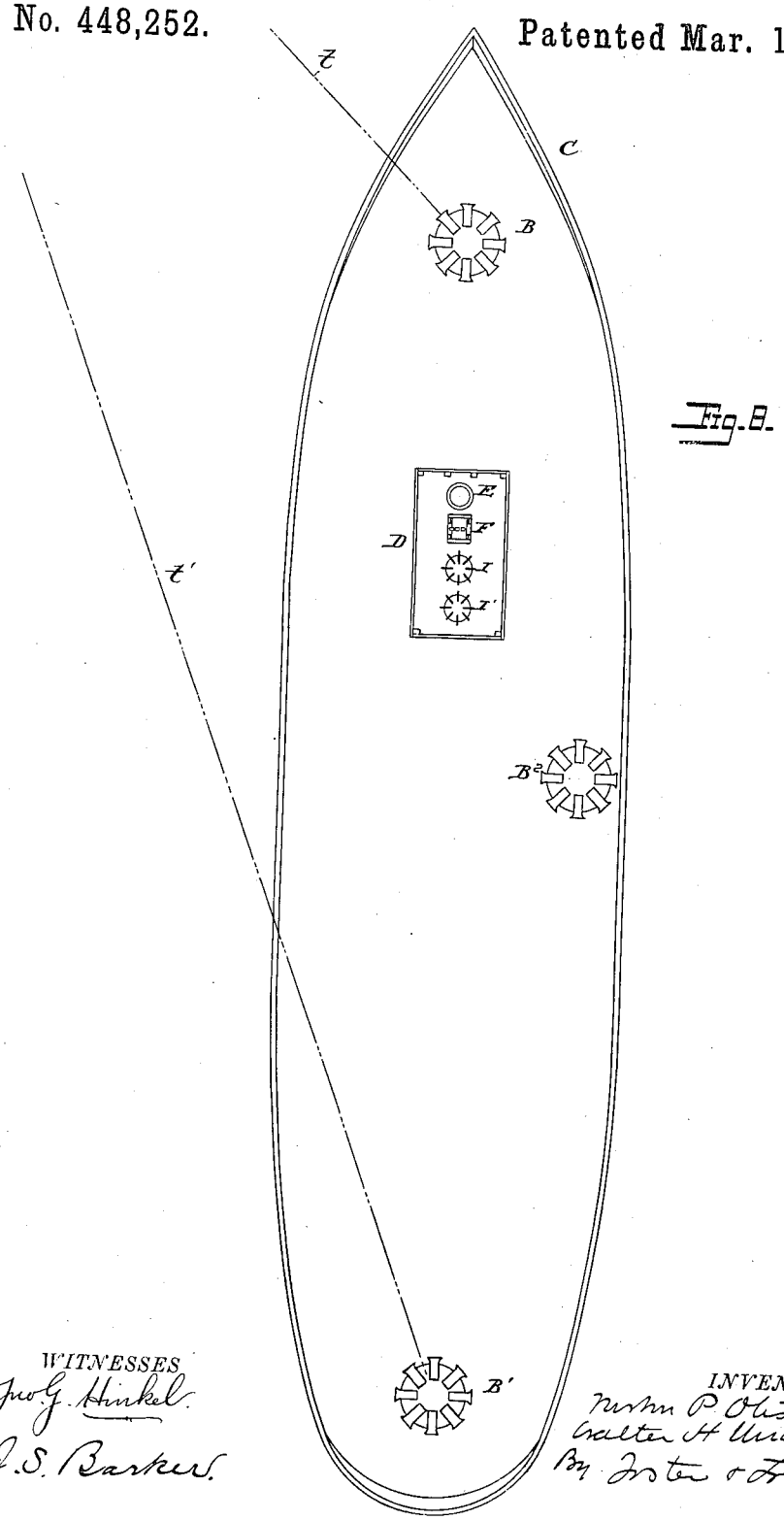

(No Model.) 6 Sheets—Sheet 1.
N. P. OTIS & W. H. UNDERWOOD.
METHOD OF AND APPARATUS FOR DETERMINING THE DIRECTION OF SOUNDS.
No. 448,252. Patented Mar. 17, 1891.
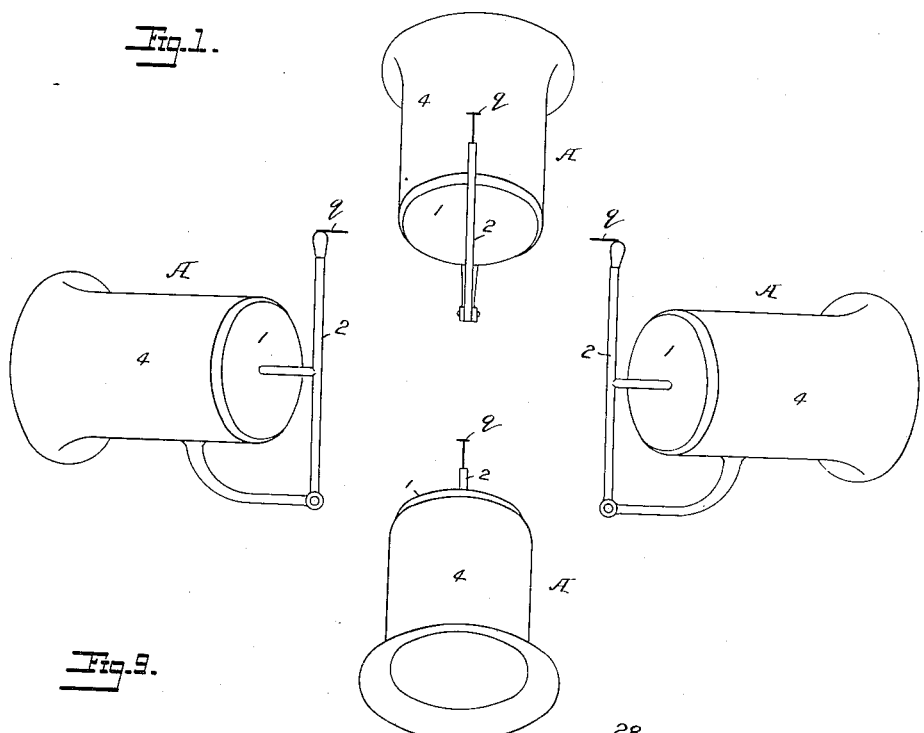
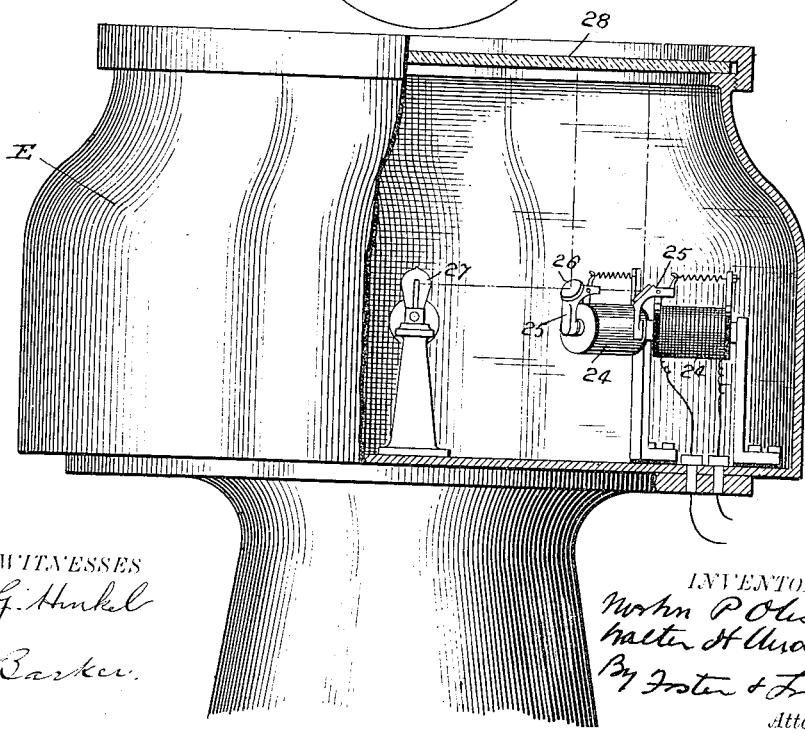
WITNESSES
INVENTORS
Attorneys (No Model.) 6 Sheets—Sheet 2.
N. P. OTIS & W. H. UNDERWOOD.
METHOD OF AND APPARATUS FOR DETERMINING THE DIRECTION OF SOUNDS.
No. 448,252. Patented Mar. 17, 1891.
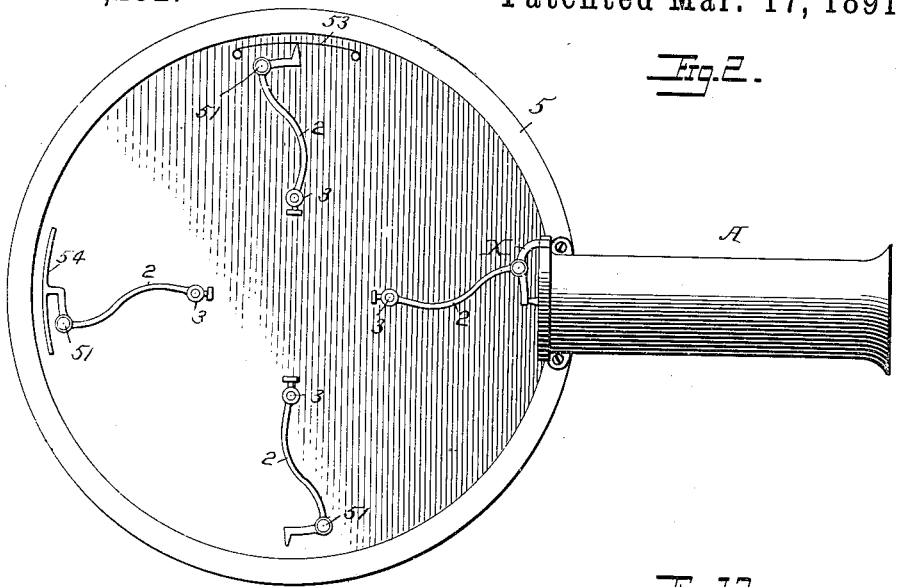
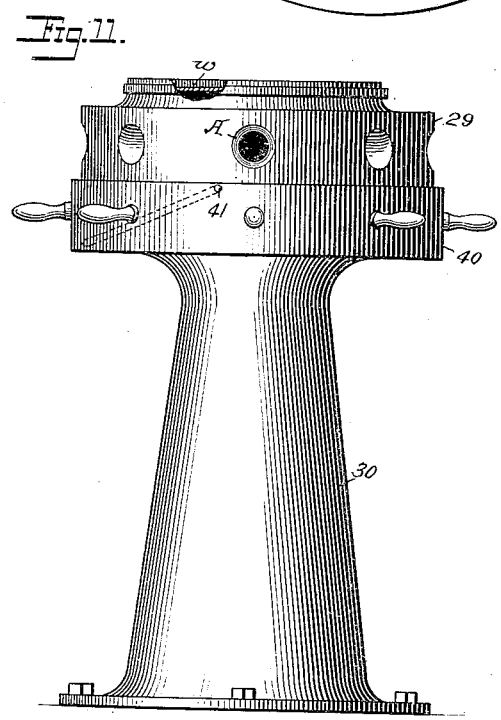
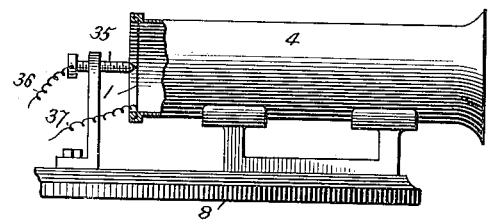
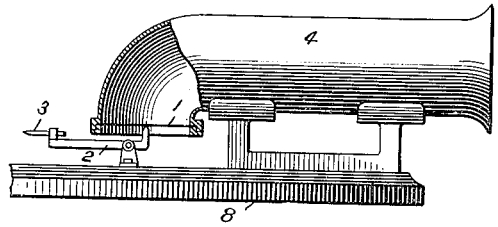
WITNESSES
Jno. G. Hinkel
J. S. Barker.
INVENTORS
Norton P. Otis
Walter H. Underwood
By Foster & Freeman
Attorneys (No Model.) 6 Sheets—Sheet 3.
N. P. OTIS & W. H. UNDERWOOD.
METHOD OF AND APPARATUS FOR DETERMINING THE
DIRECTION OF SOUNDS.
No. 448,252. Patented Mar. 17, 1891.
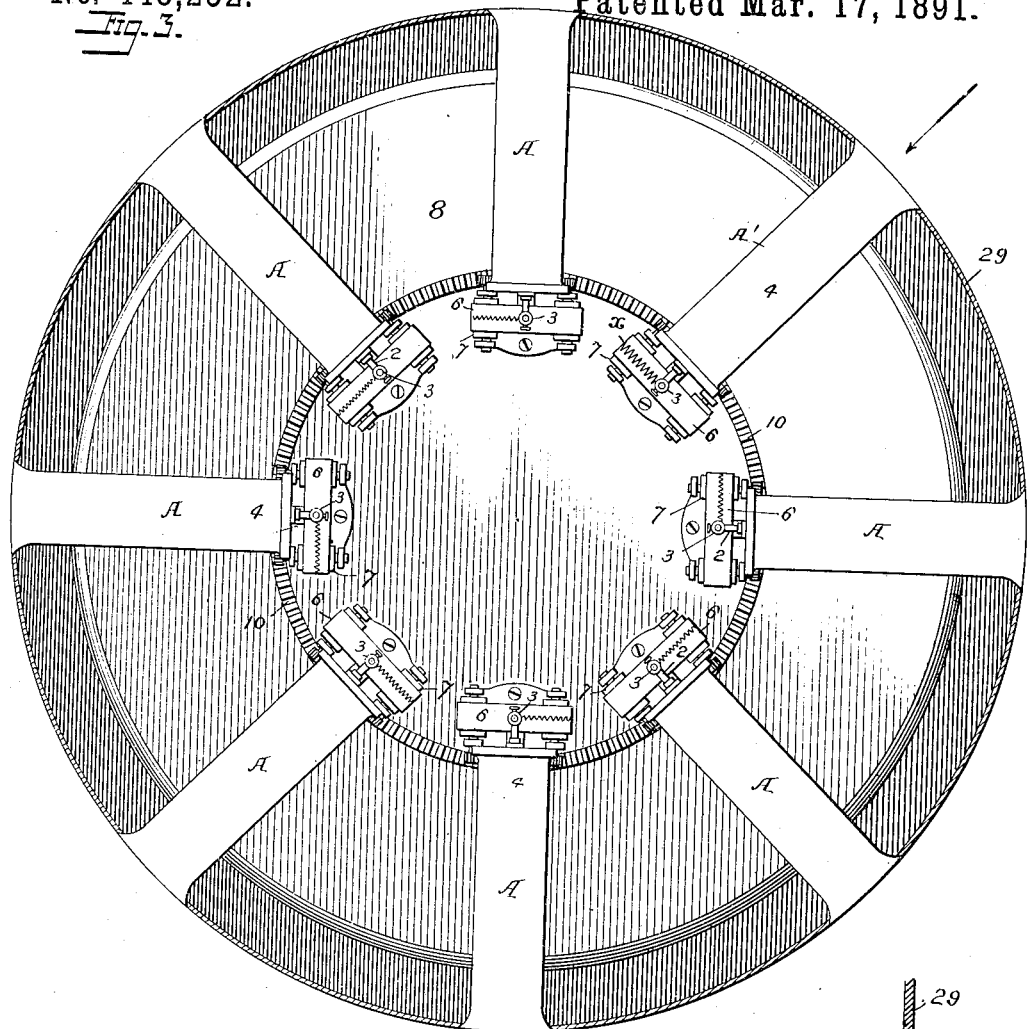
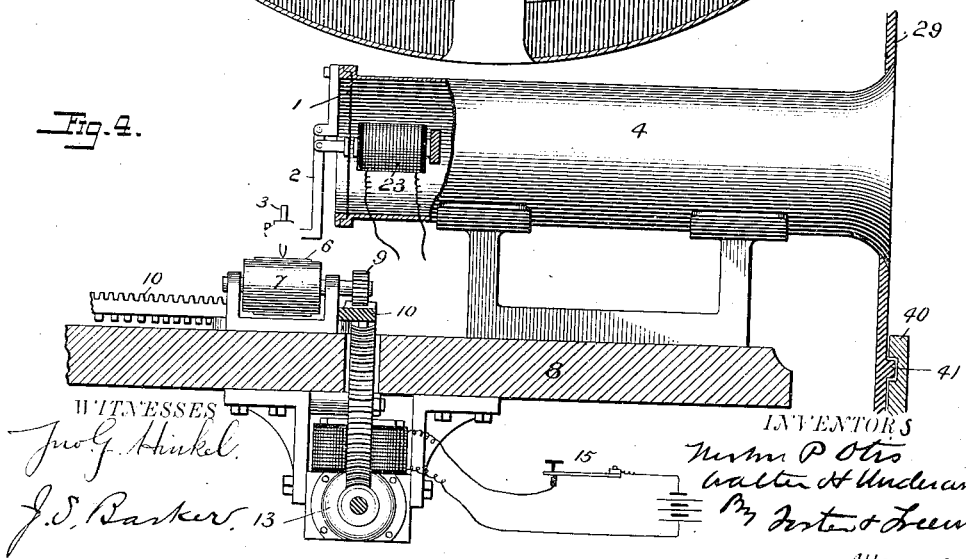

(No Model.) 6 Sheets—Sheet 4.
N. P. OTIS & W. H. UNDERWOOD.
METHOD OF AND APPARATUS FOR DETERMINING THE DIRECTION OF SOUNDS.
No. 448,252. Patented Mar. 17, 1891.
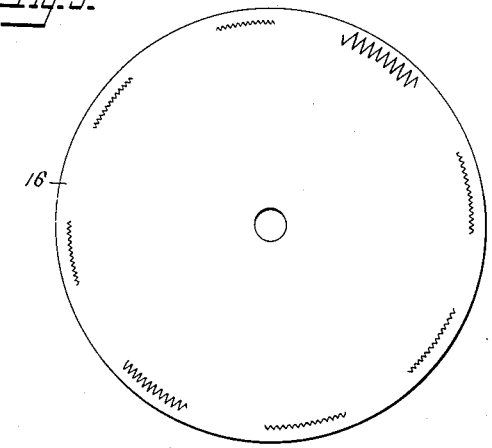
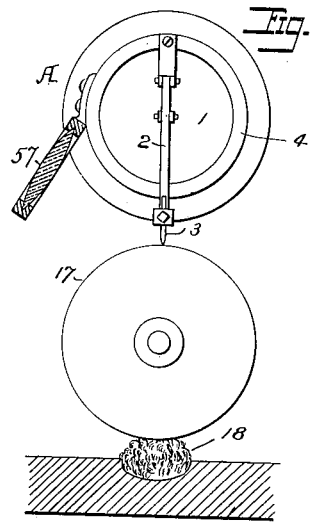
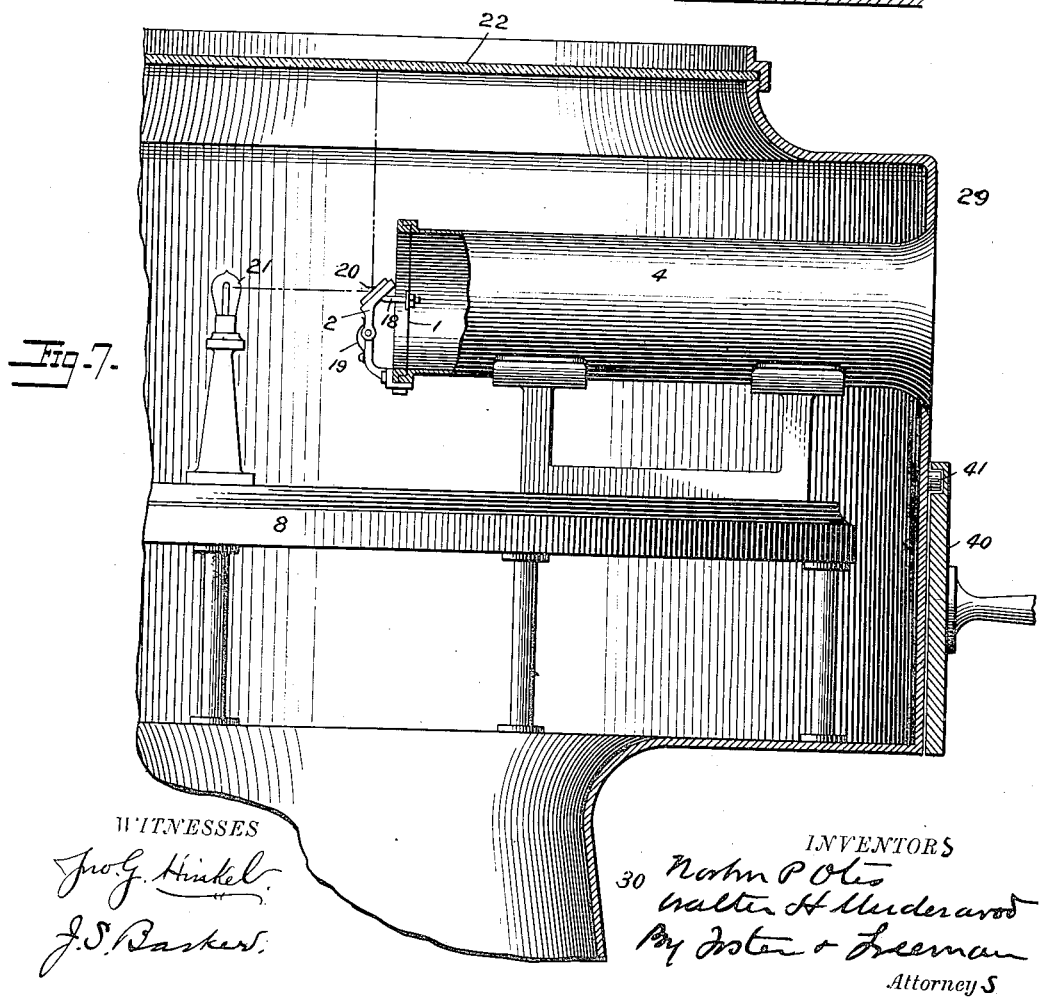
WITNESSES
Jno. G. Hinkel
J. S. Barker
INVENTORS
Norton P. Otis
Walter H. Underwood
By Foster & Freeman
Attorneys (No Model.) 6 Sheets—Sheet 5.

N. P. OTIS & W. H. UNDERWOOD.
METHOD OF AND APPARATUS FOR DETERMINING THE DIRECTION OF SOUNDS.

No. 448,252. Patented Mar. 17, 1891.

WITNESSES
Jno. G. Hinkel.
J. S. Barker.

INVENTORS
Norton P. Otis
Walter H. Underwood
By Foster & Freeman
Attorneys

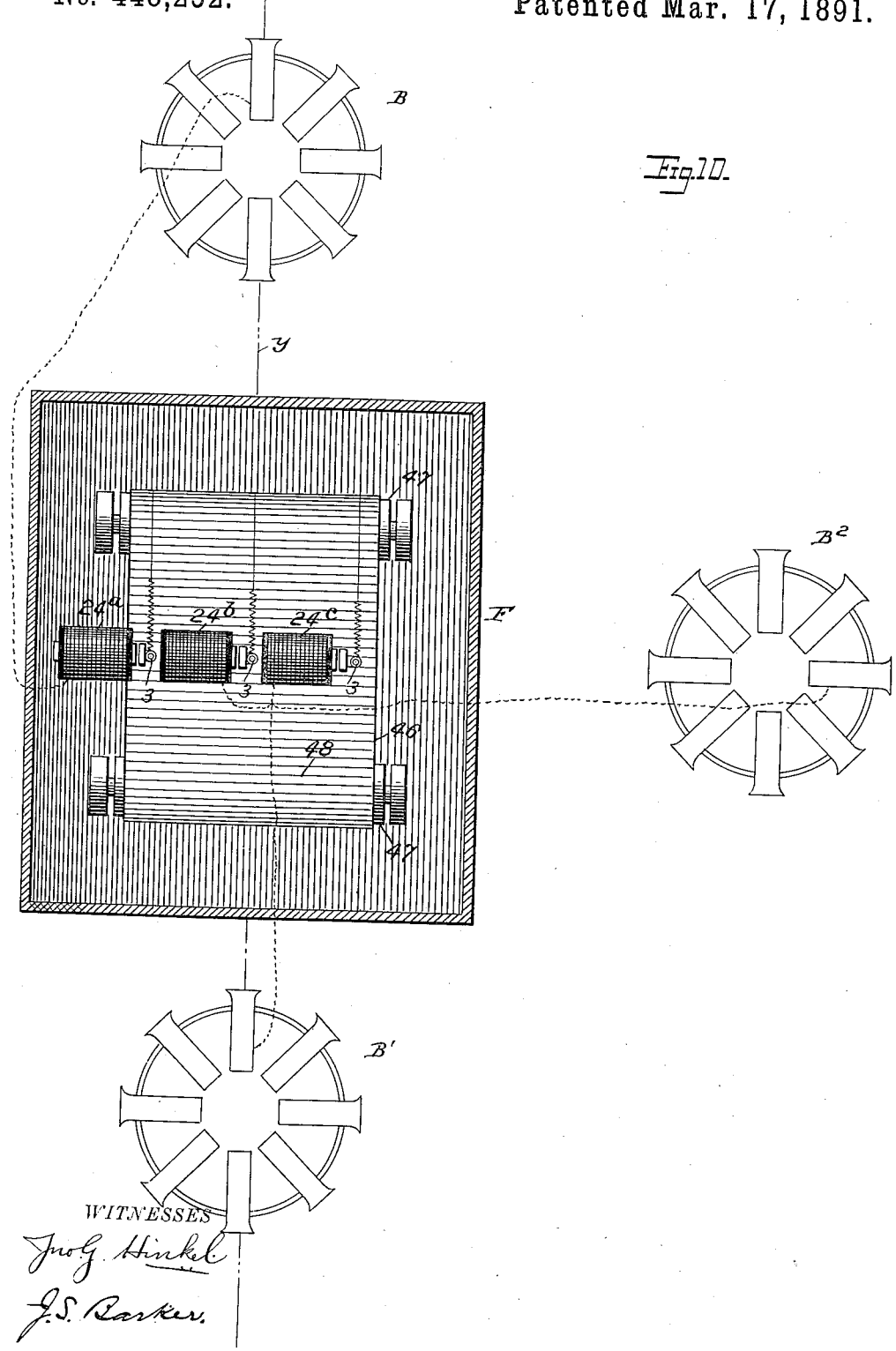

UNITED STATES PATENT OFFICE.

NORTON P. OTIS AND WALTER H. UNDERWOOD, OF YONKERS, NEW YORK.

METHOD OF AND APPARATUS FOR DETERMINING THE DIRECTION OF SOUNDS.

SPECIFICATION forming part of Letters Patent No. 448,252, dated March 17, 1891.

Application filed April 18, 1890. Serial No. 348,565. (No model.)

*To all whom it may concern:*

Be it known that we, NORTON P. OTIS and WALTER H. UNDERWOOD, of Yonkers, Westchester county, New York, have invented a certain Method of and Apparatus for Determining the Direction of Sounds, of which the following is a specification.

This invention relates to a method of and apparatus for determining more accurately than has been possible heretofore the source or direction of sound. Up to the present time great difficulty has been experienced, especially upon vessels at sea, in ascertaining by the sense of hearing or by any other known means the direction or the source from which sound proceeds—as, for example, a fog-signal—and consequently risks are incurred and disasters take place which would be largely avoided by an adequate method and apparatus for accurately furnishing this information.

In our invention we avail ourselves of the effect of sound-waves upon any object—for instance, a diaphragm or diaphragms—and although we shall hereinafter refer to diaphragms as constituting the wave-receiving devices we wish it to be understood that we include thereby anything sensitive to sound-waves and adapted to indicate or transmit their action in any way. This effect varies in degree according to the exposure of the diaphragms more or less directly to the sound-waves, and in carrying out our invention we arrange our apparatus with one, two, or more vibrating membranes or diaphragms set or moved to receive more or less directly the sound-waves proceeding from a signal or other source and connected with indicators, which may also be recorders, whereby the extent of vibrations of each diaphragm or of a single diaphragm when moved to different positions is indicated, and as the variations and indications are greatest when the sound-waves strike the diaphragm at right angles the determination of the relative movements of the diaphragm or diaphragms will positively indicate the direction from which the sound proceeds.

Another means of carrying our invention into effect is by placing two or more instruments, each consisting of one or more diaphragms and their indicating or recording devices, at certain known points distant from one another, and when the instruments are so placed—as, for example, one at the bow and one at the stern of a ship, and perhaps a third at one side of the ship and midway between the other two, with an indicating or a recording apparatus to which each is connected—it will be apparent that data will be thereby afforded upon which certain calculations may be based, among which, from the difference in the angles at which the sound-waves strike the diaphragms in the different instruments, the distance and source as well as the direction of a sound may be approximately (at least) calculated, and such result may be reached by noting upon a common indicator or recorder the interval of time between the contacts of the sound-waves with various instruments.

For the purpose of illustrating our invention we have shown in the accompanying drawings certain means which are effective; but we wish it to be understood that they are merely examples of different apparatus which may be employed for this purpose.

In the said drawings, Figure 1 is a perspective diagrammatic view illustrating the principle of operation of our invention. Fig. 2 illustrates a modification. Fig. 3 is a plan of a complete indicating apparatus. Fig. 4 is a sectional elevation, enlarged, of one of the indicators and adjuncts. Figs. 5, 6, and 7 illustrate modifications. Fig. 8 illustrates the arrangement of the apparatus upon a vessel. Fig. 9 is a view illustrating the construction of one of the receivers. Fig. 10 is an enlarged diagrammatic illustration of the receiving apparatus connected with a series of indicators. Fig. 11 represents the stand inclosing the indicator apparatus. Figs. 12 and 13 are views illustrating modifications.

Before describing the actual construction of an operative apparatus we will refer to the diagrammatic view, Fig. 1, which illustrates the principle of operation involved in our invention. In said figure there are four indicators A, set in four different positions and each consisting of a diaphragm or membrane 1, mounted or supported in any suitable manner so as to vibrate readily under the action of sound-waves, and each connected to operate an indicating device (shown in Fig. 1) in the form of a lever 2, pivoted at the lower end and carrying at the free or vibrating end in Fig. 1 a loop of platina or other suitable material in constant electric circuit, whereby it is rendered incandescent. Such indicating device, however, may consist simply of a lever with a point of strong color contrasting with the surrounding objects, so that when the lever is rapidly vibrating there will be represented to the eye a line or dash $q$ of light or color of a length corresponding to the length of the vibration. Opposite each diaphragm 1 is a sound-collector 4 in the form of a tube of suitable length, preferably flaring at the outer end.

If a sound-wave proceeds from an object directly in line with any one of the indicators A, it will strike the diaphragm of said indicator more directly and will cause a greater vibration of said diaphragm than of those of the other indicators, and by observing in any manner, and preferably by recording, the comparative degrees of vibration the direction of the sound may thus be determined. If, for instance, a sound is heard proceeding from any source and an examination of the instrument shows that the diaphragm of the indicator at the right, Fig. 1, is vibrated to a greater extent than those of the other indicators, it will at once be known that the source of the sound is more nearly in line opposite the said indicator than with the other indicators, while if it should appear that the diaphragm of the opposite indicator vibrates to the greatest extent it will at once be known that the source of the sound is in the opposite direction.

If it should be seen that the diaphragms of two adjacent indicators vibrate to about the same extent and to a greater degree than those of the other indicators, it will be known that the source of sound is at a point between and opposite the said indicators whose diaphragms have the greatest vibrations. In order, however, to insure a better indication, it is desirable to multiply the number of indicators, using eight or more, as will hereinafter be set forth, or a single indicator A, Fig. 2, may be used, capable of being turned or moved to different points. This arrangement, however, is not so exact, as the extent of the vibrations at the different points cannot be simultaneously compared, as in the former case. The details of this figure will be hereinafter described.

Referring now to the construction of an operative instrument whereby the extent of vibration of the different indicators may be visibly recorded, Fig. 3 illustrates a plan in which there are eight indicators, and Fig. 4 is an enlarged sectional elevation of one of these indicators.

Each indicator is provided with a diaphragm 1 and an indicating device having a recorder 3, carried by a lever 2, and a tubular sound-collector 4, the lever 2 being pivoted adjacent to the point of connection with the diaphragm, so as to magnify the movement of the recording end, and the recorder consisting of a pencil which rests upon a strip of paper 6, wound upon opposite parallel rollers 7 7, so as to travel in a direction at right angles to the movement of the recorder. As shown, the various pairs of rollers are supported by brackets upon the platform 8 of the instrument, and a pinion 9 on the shaft of each roller gears with an annular rack 10, which is caused to revolve by the action of any suitable motor—as, for instance, an electromotor 13—carrying a worm upon its armature driving a worm-wheel engaging with pins upon the under side of the annular rack 10. Inasmuch as it is only necessary as a general thing to operate the indicator occasionally, means may be employed for throwing the motor into and out of operation as occasion may demand—for instance, through the medium of a circuit-breaker 15.

So long as the diaphragms of the different recorders remain quiescent each pencil 3 will indicate upon the traveling strip 6 a continuous comparatively-straight line; but should any one or more of the diaphragms be vibrated an undulating line will be produced, the undulation being greater according to the extent to which the diaphragms are vibrated, and those diaphragms being vibrated to the greatest extent in proportion to their direct exposure to the line of the sound-waves and facing the source of sound. Thus, assuming that the sound-waves move directly in the direction of the arrow, Fig. 3, so as to act most directly upon the diaphragm of the indicator A', the undulating line $x$ produced upon the strip 6 of said indicator will have deeper undulations than those of the lines produced by any of the other indicators, thereby at once indicating to the observer the direction from which the sound proceeds.

It will be evident that various means may be employed for recording the indications other than the traveling strips. For instance, a disk 16, Fig. 5, may be substituted for the various strips, and when rotated under the different recorders will be marked as illustrated, or a single drum 17, Fig. 6, may receive upon its periphery the marks made by one of the recorders, a sponge 18 serving to remove each record after it has passed from sight, leaving the surface clean for a subsequent record. A more delicate recorder is illustrated in Fig. 7, in which each lever 2 bears upon a pin 18, projecting from the adjacent diaphragm 1, and is moved by the latter in one direction and by a light spring 19 in the opposite direction, and carries a mirror 20, all the mirrors of the different indicators being arranged to receive a light from a central source—as, for instance, a small incandescent lamp 21. Each mirror is arranged at such an angle as to reflect a beam of light upward upon a sheet of ground glass 22. So long as the diaphragms are not in vibration the reflection from each mirror will remain as a single spot upon the glass; but any vibration of any diaphragm will rapidly move the corresponding mirror, causing the reflected light to appear as a line or dash. By arranging the plate 22 at a considerable distance from the mirrors slight differences in the vibration of the different diaphragms may be greatly magnified, so that it will be easy to distinguish at a glance the differences in the extent of vibrations, and consequently to determine the directions of the sources of sound.

In Fig. 8 we have illustrated one of the apparatus B, consisting of a series of eight indicators arranged near the bow of a vessel C in such exposed position as to receive sound-waves from different directions with but little interruption and accessible for ready observation, and in connection with said vessel there may be arranged within the pilot-house or other suitable place D a receiving-instrument E, so constructed as to record or duplicate the actions of the different diaphragms of the instrument B, so as to thereby prevent any mistake from inattention or error of the lookout in charge of the instrument B.

The instrument may be constructed in any suitable manner to transmit the motions of the several diaphragms of the instrument B to a movable portion of the instrument E. Thus an electro-magnet 23 may be arranged opposite the metallic diaphragm 1 of each indicator, as shown in Fig. 4, with the coils of said magnet in connection with those of a magnet 24 of the instrument E, as shown in Fig. 9, the latter magnet operating upon the pivoted armature 25, carrying a mirror 26, receiving light from a lamp 27, and indicating its movements upon a sheet 28 of ground glass in the same manner as in the apparatus illustrated in Fig. 7.

As each magnet of the instrument B is connected with a correspondingly-arranged magnet in the instrument E, the movements of one armature will be synchronous with those of the other, so that there is a duplication of indications, while in many instances the indications within the pilot-house may be depended upon wholly without any observation of the instrument B.

In connection with two or more receivers within the pilot-house or other suitable location may be used two or more indicators stationed at different parts of the ship, so that one will receive the sound-waves in advance of the other, the relation in which such sound-waves are received and the receiving-instruments actuated indicating the direction of the source of sound. Such a receiver F is indicated in the pilot-house D in Fig. 8 and in an enlarged view, Fig. 10. In such receiver there are three receiving electro-magnets 24, similar to that illustrated in Fig. 9, except that each armature is provided with a recorder 3 in the form of a pencil, all the recorders being upon the same line transverse to the direction of movement of a sheet 46, which may be a traveling strip wound upon rollers 47 and provided with a series of parallel cross-lines 48.

One of the receiving-magnets—for instance, that marked 24$^a$—is in electrical connection with one of the magnets 23, Fig. 4, of one of the indicators of the instrument B, another receiving-magnet 24$^c$ is in connection with one of the magnets of the indicator B' at the stern of the vessel, while the central receiving-magnet 24$^b$ is in like connection with one of the magnets of one of the indicators of an instrument B$^2$ about midship and as far as possible to one side of a line $y$, passing through the other two instruments B B'. By observing the differences in the times at which the different recorders 3 begin their records upon the traveling sheets 26 the direction from which the sound proceeds may at once be determined.

Inasmuch as there is an appreciable difference in distance between the different instruments and any possible source of sound outside of a vessel of any considerable length, it will be evident that the sound-waves will reach the different instruments in succession, and if it be found that the instrument 24$^a$ begins its record in advance of the others it will be known that the sound proceeds from a source forward of the vessel, while if the instrument 24$^c$ first begins its record the sound will proceed from a source beyond the stern of the vessel, while if the record from the instrument 24$^b$ is first made it will be known that the source of sound is at the right. In like manner, if the records of the two instruments 24$^a$ 24$^c$ begin simultaneously preceding that of the instrument 24$^b$, it will be known that the source of sound is at the left.

In the illustration afforded by Fig. 10 the record shows that the instrument 24$^a$ has begun its operation first, followed by 24$^b$, and then by 24$^c$, thus indicating that the source of sound is ahead of the vessel.

By the use of a traveling strip with cross-lines slight variations in the positions of the undulations are rendered readily apparent to the eye, so as to determine the order in which such undulations have begun.

The sheet 46 may be of plain or ground glass, with or without transverse lines, and instead of recorders the indications may be thrown onto the glass by mirrors, as before described.

While the above-described instrument may be suitably mounted on any available support, we prefer to inclose the same completely, excepting the outer faces of the diaphragms, within a circular casing 29, mounted upon a pedestal 30, Fig. 11, having a central opening with a glass cover $w$, which cover, if desired, may be the ground-glass sheet 22, Fig. 7. By thus inclosing and covering the indicators the sound-waves reach the diaphragms only at the outer faces, so as to avoid confusion in the action upon the diaphragms that might otherwise result.

To cover the outer ends of the collector-tubes when the instrument is not in use, we employ a covering-shield 40, vertically adjustable in any suitable way. For instance, it may have internal threads or inclines adapted to corresponding bearings 41 on the casing 29 of the instrument, so that by turning the shield it may be raised or lowered.

In addition to the means heretofore described, where the two instruments B B' are employed, or in connection with such instruments without the instruments E and F, means may be used whereby the different angles at which the sound-waves reach the instruments B B' are ascertained, and thereby an approximate estimate be formed not only of the direction but the distance of the object from which the sound proceeds. Thus if by observing the instrument B it is found that the sound proceeds from an object in a direction indicated by the line $t$, Fig. 8, and by observing the instrument B' the indications show that the object is in a direction indicated by the line $t'$, the angles of these two lines being thus ascertained and the distance between the instruments B B' being known, the point of intersection of the lines $t\ t'$ and distance of the object giving the sound may be estimated.

To avoid the necessity of communication between the different points of the vessel and to facilitate comparison between the instruments, each of the indicators of the instrument B may be connected with the magnet of an instrument I, while each of the indicators of the instrument B' may be connected with the magnet of the instrument I', the two instruments I I' being arranged in proximity within the pilot-house, and the magnet of each instrument I I' being arranged in the same manner as the indicators, and each provided with an armature and mirror, as in Fig. 9, or being otherwise constructed so as to record the vibrations in the armature of the magnet corresponding to those of the diaphragm with which it is electrically connected.

In order to increase the intensity of the action of the armature and recorder in any of the above-described instruments, we may produce variations in an electric current by a microphonic action instead of depending upon variations in an induced current. In such case the diaphragm 1, Fig. 12, bears upon a screw 35, and conductors 36 37, connected with the diaphragm and screw, have in circuit a battery and the electro-magnet of the recorder 24 or other recording-instrument.

In order to render more clearly apparent the indications of any recorder, a lens 57, Fig. 6, may be arranged so as to magnify the indications.

When a single indicator is used, as illustrated in Fig. 2, it may be connected to a ring 5, which may be turned by hand or by gears, like the ring 10, Fig. 4, to different positions, and the arm 2 may be pivoted to a bracket upon the indicator, as shown at X, Fig. 2, so as to be carried with the indicator; or there may be a series of arms 2, each pivoted to a stationary pin 51, the indicator-diaphragm being brought opposite each arm. To prolong the action of the diaphragm while the indicator is at different points, each arm 2 may bear upon a spring 53, against which the diaphragm bears when sent to different points, or a bar 54 may be carried by the pivoted arm 2. In connection with any of these devices any of the above-described or other recording means may be employed.

If desired, the diaphragm may be placed horizontally, with collector-tubes constructed to direct the sound-waves downward, as shown in Fig. 13.

It will be seen that we have described a mode of determining the direction of sounds, first, by indications which show the main direction in which the sound-waves travel, and, second, by determining the relative times at which the sound-waves reach separated points, and that both these means of determining the directions may be employed in connection with the apparatus above described.

Without limiting ourselves to the use of the instruments herein set forth or in said instruments to the special forms and arrangements of parts shown, we claim as our invention—

1. The method of determining the direction of sounds from a single point, which consists in receiving the sound-waves at two or more different points and in indicating the effects caused by such sound-waves, substantially as described.

2. The method herein set forth of determining the direction of sound-waves, which consists in indicating the varying action of sound-waves from one point upon indicating devices at different points, substantially as set forth.

3. An instrument for indicating the direction of sounds, provided with two or more diaphragms arranged in different positions, with means for indicating variations in the degree of movements of said diaphragms, substantially as set forth.

4. The mode described of determining the direction of sound by the use of two or more diaphragms arranged to receive sounds directly from different directions and means for visibly indicating variations in the effects produced on said diaphragms, substantially as set forth.

5. The method of determining the direction of sounds, which consists in indicating or visibly recording the effects of sound-waves on one or more instruments constructed to be sensitive to such sound-waves and placed in different positions, substantially as set forth.

6. The method of determining the direction of sounds, as herein described, which consists in receiving sound-waves upon one or more instruments sensitive thereto and set in different positions and indicating the effects thereof, substantially as described.

7. An instrument for indicating the direction of sounds, provided with one or more diaphragms arranged in different positions, with means for visibly indicating variations in the degrees of movement resulting at the different places, substantially as set forth.

8. An instrument for indicating the direction of sounds, provided with two or more diaphragms arranged in different positions, with means for visibly indicating variations in the degree of movement of said diaphragms, substantially as set forth.

9. The combination, with an instrument provided with two or more diaphragms arranged in different positions to be actuated to different degrees by sound-waves, of a receiving-instrument having electro-magnets, each connected to be operated electrically by one of said diaphragms and provided with recording means for indicating the different movements of the armatures of said electro-magnets, substantially as and for the purpose set forth.

10. The combination, with two or more indicators arranged in separated positions and each provided with a diaphragm arranged to be operated by sound-waves, of a corresponding number of electro-magnets arranged in proximity, each connected with one of the indicators for its armature to move synchronously with the diaphragm thereof, and recorders for indicating the order in which the different armatures receive their impulses, substantially as set forth.

11. The combination, in an instrument for indicating the direction of sounds, of two or more diaphragms arranged to receive directly sounds proceeding from different directions, provided each with a marking device connected to be operated by said diaphragm, and a traveling sheet moving in contact with said marking device, substantially as set forth.

12. The combination of the series of indicators, each provided with a recording device and arranged in position for the different records to be simultaneously seen and compared, substantially as and for the purpose set forth.

13. The combination of two or more indicators sensitive to sound-waves and arranged in different positions and a receiving and recording instrument connected with all the indicators, substantially as set forth.

14. The combination, with the indicators arranged at separated points and with corresponding receiving-magnets and recorders operated thereby, of a sheet 46, adapted to receive the several records, substantially as described.

15. The combination, with the indicators arranged at separated points and with corresponding receiving-magnets and recorders operated thereby, of a sheet 24, provided with transverse lines and adapted to receive the several records, substantially as described.

16. The combination, with a vessel, of two instruments B B', arranged in different positions, each instrument provided with a series of devices sensitive to the action of sound-waves from different directions, substantially as set forth.

17. The combination, with a vessel, of two or more instruments B B', each provided with a series of diaphragms, and means for recording the actions thereof under the influence of sound-waves, and recorders at a central point connected with the different indicators to operate synchronously therewith, substantially as set forth.

18. The combination, with a series of indicators arranged radially and each provided with a diaphragm adapted to be operated by sound-waves, of recording devices connected with the diaphragms, substantially as set forth.

19. The combination, with a series of indicators, each provided with a diaphragm adapted to be operated by sound-waves, of a corresponding series of recording devices arranged at a distant point and each connected electrically with one of the diaphragms to move therewith, substantially as described.

20. The combination, with a series of diaphragms and indicators adapted to be actuated by sound-waves, of mirrors connected to be moved by said diaphragms and a lamp arranged in position for its rays to fall upon the mirrors, substantially as set forth.

21. The combination, with a series of indicators arranged radially and each provided with a diaphragm adapted to be operated by sound-waves, of a series of visual recorders, each connected to be operated by one of the diaphragms, substantially as and for the purpose set forth.

22. The combination, with a series of recording devices, of a single indicator and means for adjusting the same to different positions to operate the different recorders, substantially as set forth.

In testimony whereof we have signed our names to this specification in the presence of two subscribing witnesses.

NORTON P. OTIS.
WALTER H. UNDERWOOD.

Witnesses:
CHARLES E. FOSTER,
EDWD. K. ANDERTON.